July 17, 1951          A. J. NELSON          2,560,813
PRESSURE FLUID SERVOMOTOR
Filed June 17, 1948          3 Sheets-Sheet 2
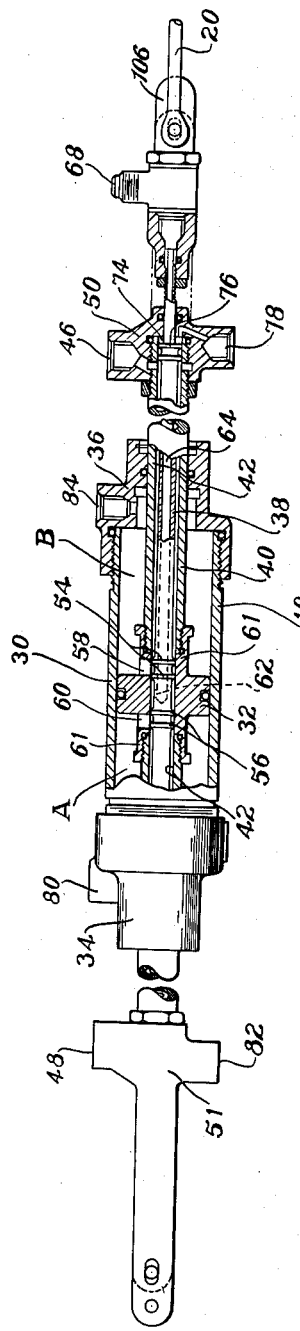
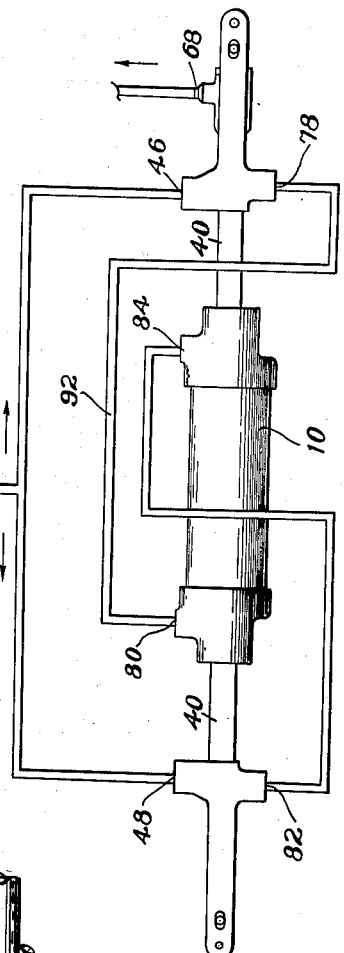
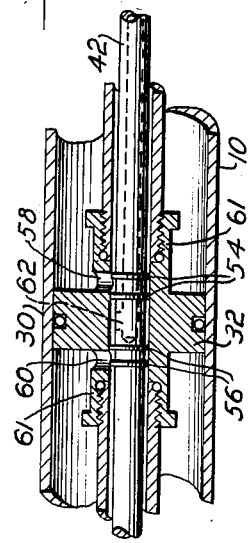
INVENTOR.
Andrew J. Nelson
BY
M. B. Tasker
ATTORNEY July 17, 1951 A. J. NELSON 2,560,813
PRESSURE FLUID SERVOMOTOR
Filed June 17, 1948 3 Sheets-Sheet 3

INVENTOR.
Andrew J. Nelson
BY
M. B. Tasker
ATTORNEY

Patented July 17, 1951

2,560,813

UNITED STATES PATENT OFFICE 2,560,813

PRESSURE FLUID SERVOMOTOR

Andrew J. Nelson, Stratford, Conn., assignor to United Aircraft Corporation, East Hartford, Conn., a corporation of Delaware Application June 17, 1948, Serial No. 33,501

4 Claims. (Cl. 121—41)

This invention relates to aircraft servomotor control systems and particularly to improved boost strut pressure fluid servomotor mechanisms.

It is an object of this invention to provide a servomotor mechanism that can operate any of the control surfaces on an aircraft and which can easily be installed in the control system.

It is a further object of this invention to provide a servomotor which supplies all the force necessary for moving a control surface and which carries integral mechanism for imparting the necessary "feel" to the pilot's control member.

A still further object of this invention is to provide an improved servomotor mechanism which provides the total force necessary to move an aircraft control surface under high aerodynamic loading and which also produces a proportionate resisting force in the pilot operated controls.

Another object of this invention resides in the provision of a simple, rugged aircraft control surface servomotor which imparts "feel" or resistance forces in the pilot's control member to a degree which is less than but proportionate to the forces necessary to move the control surface.

These and other objects and advantages of this invention will become readily apparent from the following detailed description of the drawings which indicate a preferred embodiment of the invention. In this description, reference will be made to a system for controlling the rudder of an aircraft. However, it is obvious that only minor changes need be made in the installation in order to operate any other of the control surfaces on the aircraft.

In these drawings,

Fig. 2 is a partial sectional view of the servomotor indicating the internal mechanism and structure;

Fig. 3 is a partial schematic view of the hydraulic line connections to the servomotor;

Fig. 8 is an enlarged detail view of the piston and valve rod in neutral position.

Figure 1:
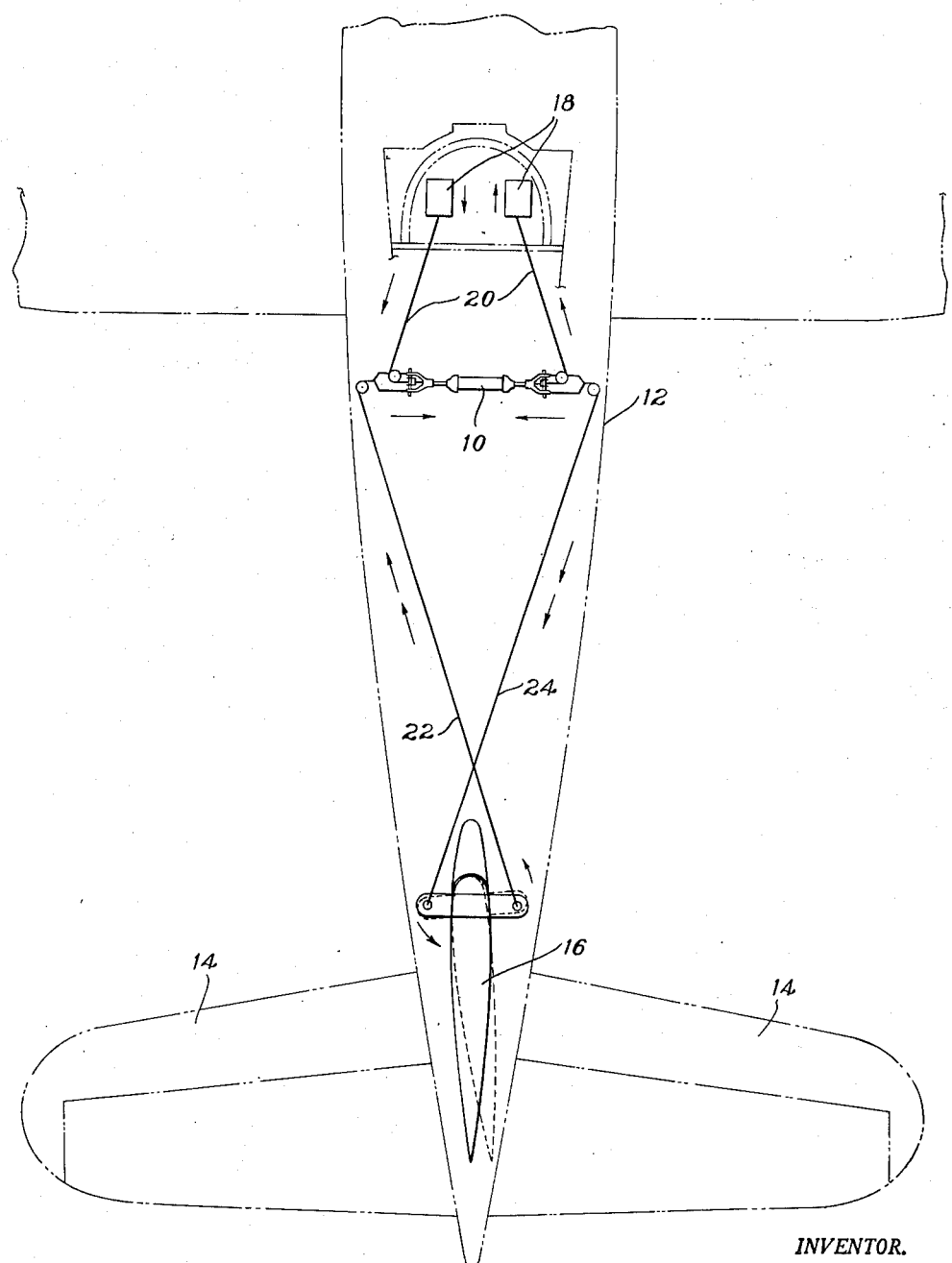
Fig. 1 is a schematic view of an airplane fuselage indicating a rudder servomotor system installed according to this invention.

Referring now to Fig. 1, a pressure fluid servomotor 10 is mounted on the airplane structure within the fuselage 12 which has horizontal tail surfaces 14 and a rudder 16. The pilot's rudder pedals 18 are connected to the opposite ends of the servomotor 10 by means of control cables 20. The ends of the servomotor 10 are also connected to the rudder 16 by the control cables 22 and 24. As shown by the arrows in Fig. 1, when the pilot actuates his pedals for a right turn the cables 20 actuate the servomotor 10 thereby operating control cables 22 and 24 to move the rudder 16 from the full line to the dotted line position as shown.

The operation and construction of the boost servomotor 10 is better understood and seen by referring to Fig. 2. The servomotor 10 consists of a cylinder 30 having a piston 32 slidably mounted therein which includes the usual packing rings to reduce leakages to a minimum. The piston 32 carries a piston rod assembly which extends axially through cylinder 10 and has a fluid tight working fit with each of the cylinder end fittings 34 and 36. The piston rod assembly is comprised of an inner, hollow valve rod 38 and an outer hollow concentric piston rod 40, which have their adjacent walls spaced apart thereby forming an annular chamber 42 therebetween. The chamber 42 permits the passage of hydraulic fluid under pressure, which is admitted through the ports 46 and 48, into the chambers A or B on either side of the piston 32. It should be noted that port 46 is contained in an end fitting 50 which is securely fastened by a threaded connection to the end of the piston rod 40. The port 48 is contained in a similar fitting 51 attached to the opposite end of the piston rod 40.

The valve rod 38 is slidable within the piston rod 40 and carries intermediate its ends pairs of lands 54 and 56. The lands 54 and 56 control the flow of hydraulic fluid under pressure from the annular chamber 42 to the ports 58 and 60, respectively, which are drilled through the walls of the cylindrical piston rod connector fittings 61 axially disposed on each side of the piston 32 but integral therewith. The ports 58 and 60, it is evident, permit the flow of fluid under pressure then to either chamber A or chamber B in the cylinder 10 in order to actuate or move the piston 32 to the right or left. The pairs of lands 54 and 56 are designed to allow a slight amount of fluid to leak from the annular chamber 42 into both chambers A and B in order to maintain the piston 32 in a neutral position. This neutral balance is not altered or upset until the valve rod 38 is activated.

The valve rod 38 has a port 62 located between the pairs of lands 54 and 56 for permitting hydraulic fluid to return from the chamber A or chamber B through its central bore 64 and thence to the return fitting 68.

In order to permit the valve rod to act as a slide valve, it has a direct connection at its respective ends to the cable 20 which connects to the pilot's rudder pedals. Additionally, the ends of the valve rod 38 have a lost motion connection with the ends of the piston rod 40. The operation of this lost motion connection will be more clearly described hereinafter.

In order to provide the pilot with a proportionate amount of "feel" in the rudder pedals, a reaction chamber 74 is provided within the fitting 50 wherein fluid under pressure acts on the land 76 when admitted via the port 78. Fluid under pressure is supplied to the port 78 from a bleed port 80 which communicates with the chamber A whenever fluid is being supplied to chamber A to move the piston 32 toward the right. The connection between the ports 78 and 80 will be clearly noted in the description of Fig. 3. Another reaction chamber is provided on the left side of the strut which obtains fluid under pressure admitted through port 82 from the bleed port 84 whenever fluid is being supplied to chamber B to move the piston 32 toward the left. Thus it can be seen that when pressure is being supplied to chamber A a certain amount of fluid will flow from the bleed port 80 to the port 78 and into the reaction chamber 74 tending to resist movement toward the right of the valve rod 38.

The flow of fluid into and out of strut 10 is clearly shown in Fig. 3. Hydraulic fluid under pressure is supplied via the line 90 into each of the ports 46 and 48 which communicate with the annular chamber 42 previously described. Upon movement of the valve rod 38 fluid is admitted to either side of the piston 32 to cause it to move in a given direction. In the event that pressure was being supplied to move the piston to the right, a certain amount of this fluid would be directed through the port 80 via the line 92 to the port 78 which leads to the reaction chamber 74 (Fig. 2). Similarly, when fluid pressure is being supplied to move the piston to the left a certain amount of this fluid will be supplied via the bleed port 84 to the port 82 and thence to its respective reaction chamber.

Figure 4:
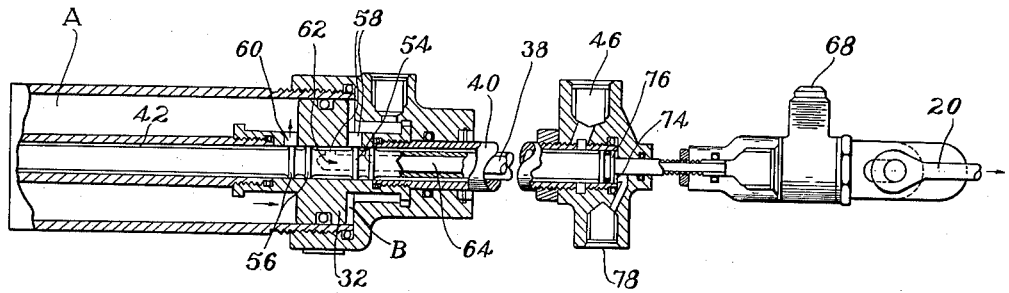
Fig. 4 is a partial sectional view of the servomotor with its actuating piston having moved to the right.
Figure 5:
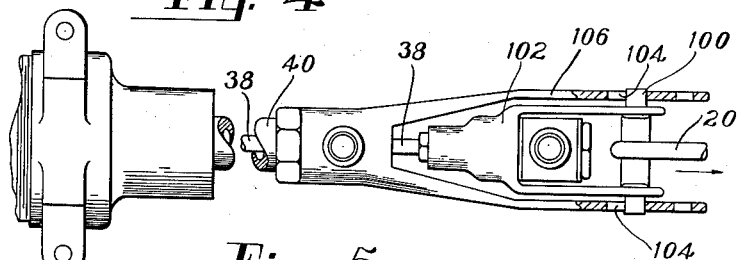
Fig. 5 is a detailed view of the control cable connection to the servomotor when the actuating piston is being moved toward the position shown in Fig. 4.

The flow of fluid into the servomotor and the operation of the valve rod 38 can be more clearly seen in Figs. 4 and 5 which show the operation of the servomotor mechanism when the piston is being actuated to the right. In operation then, when the pilot moves the right rudder pedal forward he will move the control cable 20 in the direction of the arrow shown in Fig. 5. This will cause the pin 100 of the end connection 102 on the end of valve rod 38 to slide within the slots 104 in the yoke 106. Since the yoke 106 is fixed to the end of the piston rod 40 there will be relative movement between the valve rod 38 and piston rod 40 thereby moving the pairs of lands 54 and 56 on the valve rod 38 into the position shown in Fig. 4. In this position fluid under pressure entering the annular channel 42 from the port 48 on the left side of the strut will be able to flow through the port 60 into the chamber A thereby forcing the piston 32 toward the right. At the same time fluid from the diminishing chamber B can flow through the port 58 and the port 62 located between the lands 54 and 56 into the central bore 64 of the valve rod 38 and from there outwardly through the return fitting 68. At the same time that fluid under pressure is being admitted to chamber A a certain amount of fluid will be bled via the port 80 on the left side of the servomotor from that chamber through the port 78 to apply pressure within the chamber 74 against the land 76 tending to force the inner piston rod toward the left or, in other words, tending to resist its movement toward the right. It is then obvious that as the pilot applies right rudder he will actuate the boost strut so that it will produce a force moving the control surface to the right but at the same time it will produce a resisting force which imparts "feel" to the rudder pedals.

Figure 6:
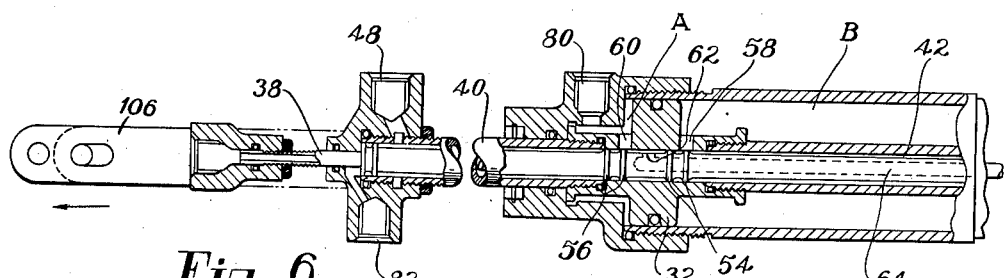
Fig. 6 is similar to Fig. 4 with the piston moving toward the left.

In moving the rudder to the left, the pilot via the control cable 20 will move the connector 120 (Fig. 7) on the left-hand end of the valve rod 38 to the left so that its pin 122 will slide toward the left within the slot 124 of the yoke 126 thereby moving the valve rod 38 and its integral lands 54 and 56 to the position shown in Fig. 6. In this position, then, fluid under pressure entering the right-hand pressure connection will flow through the annular chamber 42 through the port 58 and into chamber B tending to move the piston 32 toward the left. At the same time fluid from the diminishing port A will be exhausted through the port 62 into the bore 64 of the valve rod 38 toward the return hydraulic fluid passages.

Figure 7:
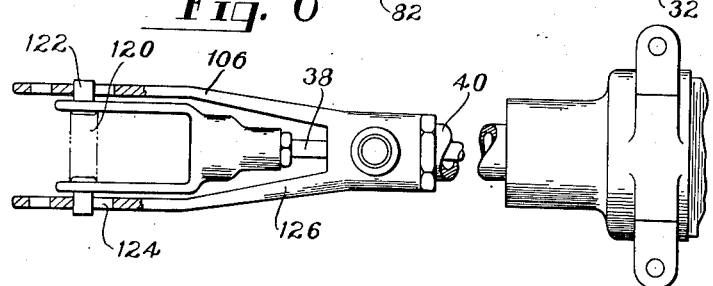
Fig. 7 is similar to Fig. 5 indicating the position of the cable connection to the servomotor when the piston is being moved toward the position shown in Fig. 6.

In the event that the hydraulic system has failed and there is no fluid under pressure to operate the system, pilot will merely move his controls in the direction, for example, as shown in Figs. 6 and 7 so that the lost motion between the valve rod 38 and piston rod 40 is taken up and the pin 122 abuts the outward end of the slot 124 in the yoke 126. In this position the lands 54 and 56 on the valve rod 38 will assume the position shown in Fig. 6 so that the piston 32 can be manually moved toward the left and fluid in the chamber A will be forced out through the port 60 thence through the port 62 and the bore 64 in the valve rod 38 toward the return system.

Although the servomotor has been shown herein as being actuated by a cable system it is obvious and evident that push-pull rod connections could be made from the rudder pedals to one end of the servomotor and thence from the other end of the servomotor to the rudder horn. The servomotor may be similarly installed in series with the control surface linkages of any of the other aircraft control surfaces without departing from the scope of this invention.

It is evident that as a result of this invention a servomotor is provided which produces all the force necessary for both the operation of an aircraft control surface in addition to the force necessary to give the pilot a proportionate amount of resistance or "feel" in the cockpit control member.

Further, this improved servomotor mechanism provides the pilot with resistance or "feel" which is proportionate to but less than the loads on the control surface. In other words the mechanism is arranged in such a manner that the greater the pedal movement the greater are the rudder loads and consequently a proportionately increased rudder pedal "feel" will be experienced.

Also, as a result of this invention a servomotor has been provided which is compact, rugged and contains integral mechanism for both producing the force necessary to move the control surface and also imparting resisting or "feel" forces to the pilot's control member.

I claim:

1. In a pressure fluid servomotor for an airplane control system, a cylinder, a piston cooperating with said cylinder, an integral rod assembly carried by said piston having a fluid tight working fit with each end of said cylinder, said rod assembly comprising inner and outer hollow rods having their adjacent walls spaced apart forming an annular chamber therebetween, said inner rod having a reciprocable lost motion connection with said outer rod, fittings secured to the ends of said outer rod at points spaced axially from the ends of said cylinder, means for admitting hydraulic fluid under pressure through said chamber and into said cylinder, means responsive to operative movement of said lost motion connection for directing said fluid under pressure to selectively actuate said piston, and means in said fittings including hydraulic means operative in response to selective actuation of said piston for resisting the operative movement of said outer rod in a degree proportionate to but less than the forces produced by said piston.

2. A pressure fluid servomotor for an airplane control system comprising a cylinder having a piston slidably mounted therein, said piston adapted to be actuated by hydraulic fluid under pressure, a cooperating piston rod assembly extending axially through said cylinder and having a fluid tight sliding fit with the ends thereof, fittings adjacent the ends of said rod remote from said cylinder, said assembly including inner and outer concentric hollow rods having their adjacent walls spaced apart forming an annular chamber therebetween, a plurality of ports on said outer rod for communication with either side of said piston, a plurality of lands on said inner rod intermediate the ends thereof for opening and closing said ports, a plurality of lands on said inner rod adjacent the ends thereof remote from said cylinder forming reaction chambers in said fittings, means for admitting fluid under pressure into said annular chamber, said fluid being communicable with either side of said piston in response to movement of said inner rod, means for providing a return for fluid from within said cylinder, and means for resisting movement of said inner rod proportionate to but less than the force produced by said piston including fluid connections from opposite ends of said cylinder to said reaction chambers.

3. In a pressure fluid servomotor for an airplane control system, a cylinder, a piston cooperating with said cylinder, an integral rod assembly carried by said piston having a fluid tight working fit with the ends of said cylinder, said rod assembly comprising inner and outer hollow rods having their adjacent walls spaced apart forming an annular chamber therebetween, said inner rod having a reciprocable lost motion connection with said outer rod, means for admitting hydraulic fluid under pressure through said chamber and into said cylinder, means responsive to operative movement of said lost motion connection for directing said fluid under pressure to selectively actuate said piston, and means operative in response to selective actuation of said piston for resisting the operative movement of said outer rod in a degree proportionate to but less than the forces produced by said piston, said last mentioned means including a land on said inner rod at each extremity of said rod assembly operating in said annular chamber, and fluid connections from opposite ends of said cylinder to opposite ends of said chamber for conducting pressurized fluid to said chamber on the remote sides of said lands.

4. A pressure fluid servomotor including a cylinder and piston, a hollow piston rod attached to said piston and extending axially through said cylinder, a concentric hollow valve rod mounted within said piston rod, fittings secured to the extremities of said piston rod at points spaced axially from the ends of said cylinder, a pilot's control member having an operative connection with said valve rod, a source of hydraulic fluid under pressure for actuating said piston, mechanism incorporated in said cylinder for balancing said piston in a neutral position, said mechanism selectively upsetting said balance and controlling the direction of movement of said piston in response to movement of said member, and means in said fittings for producing forces resisting movement of said piston rod proportionate to but less than the forces produced by said piston including hydraulic means responsive to actuation of said piston.

ANDREW J. NELSON.

REFERENCES CITED

The following references are of record in the file of this patent:

UNITED STATES PATENTS

| Number | Name | Date |
| --- | --- | --- |
| 1,928,144 | Vickers | Sept. 26, 1933 |
| 1,934,691 | Baker | Nov. 14, 1933 |
| 2,220,339 | Leathem | Nov. 5, 1940 |
| 2,227,273 | Price | Dec. 31, 1940 |
| 2,262,233 | Hey | Nov. 11, 1941 |
| 2,307,910 | Baade | Jan. 12, 1943 |
| 2,345,531 | Ganahl | Mar. 28, 1944 |
| 2,393,585 | Boynton et al. | Jan. 29, 1946 |
| 2,421,726 | T. H. Thomas | June 3, 1947 |
| 2,472,236 | R. W. Thomas | June 7, 1949 |

FOREIGN PATENTS

| Number | Country | Date |
| --- | --- | --- |
| 640,814 | France | Apr. 3, 1928 |